United States Patent
Fujiwara

(10) Patent No.: US 6,582,502 B2
(45) Date of Patent: Jun. 24, 2003

(54) DYE, INK FOR INK JET RECORDING, AND INK JET RECORDING METHOD

(75) Inventor: Toshiki Fujiwara, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 36 days.

(21) Appl. No.: 09/767,727

(22) Filed: Jan. 24, 2001

(65) Prior Publication Data

US 2001/0029869 A1 Oct. 18, 2001

(30) Foreign Application Priority Data

Jan. 25, 2000 (JP) ........................................ 2000-015853

(51) Int. Cl.$^7$ ...................... C09D 11/02; C09B 29/033; C09B 29/40; C09B 29/42

(52) U.S. Cl. .................. 106/31.48; 106/31.5; 534/751; 534/752; 534/772; 534/774

(58) Field of Search ........................... 106/31.46, 31.48, 106/31.51, 31.5; 534/751, 752, 772, 774

(56) References Cited

U.S. PATENT DOCUMENTS

| | | | | |
|---|---|---|---|---|
| 3,932,122 A | * | 1/1976 | Ramanathan | 534/756 |
| 4,396,547 A | * | 8/1983 | Weaver et al. | 534/594 |
| 4,444,684 A | * | 4/1984 | Weaver et al. | 534/640 |
| 4,711,954 A | * | 12/1987 | Heidenreich et al. | 534/582 |
| 4,885,272 A | | 12/1989 | Chapman et al. | 503/227 |
| 5,037,966 A | * | 8/1991 | Naef | 534/581 |
| 5,091,517 A | * | 2/1992 | Naef | 534/728 |
| 5,466,790 A | * | 11/1995 | Gruettner-Merten et al. | 534/575 |
| 5,554,737 A | * | 9/1996 | Lamm et al. | 534/758 |
| 6,174,356 B1 | * | 1/2001 | Evans et al. | 106/31.48 |

FOREIGN PATENT DOCUMENTS

| | | |
|---|---|---|
| JP | 2-212566 | 8/1990 |
| JP | 4-22714 | 4/1992 |

* cited by examiner

*Primary Examiner*—Helene Klemanski
(74) *Attorney, Agent, or Firm*—Burns, Doane, Swecker & Mathis, LLP

(57) ABSTRACT

A dye which is represented by any of the following general formula (1), (2), (3) or (4), an ink for inkjet recording which contains at least one of the dyes, and an ink jet recording method which uses the ink. The dye has heterocyclic group which may be substituted and has at least one ionic aqueous group in a molecule.

General Formula (1)

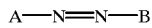

General Formula (2)

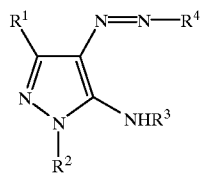

General Formula (3)

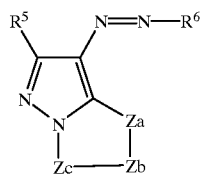

General Formula (4)

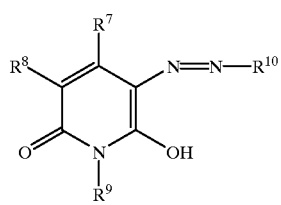

15 Claims, No Drawings

DYE, INK FOR INK JET RECORDING, AND INK JET RECORDING METHOD

BACKGROUND OF THE INVENTION

1. Field of the Invention

The present invention relates to a new dye, an ink for ink jet recording using the new dye, and an ink jet recording method.

2. Description of the Related Art

In an ink jet recording method, the cost of materials is low, high speed recording is possible, there is little noise at the time of recording, and further, color recording is easy. Accordingly, this method has spread rapidly and continues to be developed. Examples of the ink jet recording method include a technique in which pressure is applied from a piezo element so that droplets are discharged, and technique in which bubbles are generated in an ink upon heating so that droplets are discharged, and a technique in which droplets are sucked and discharged by static electricity. Further, examples of inks for ink jets include aqueous inks, oil based inks, and solid (melted-type) inks. A dye which is used for the ink for ink jet must have the following characteristics: solubility with respect to a solvent is high, high density recording is possible; hue is good; fastness with respect to light, heat, air, water, or chemicals is excellent; fixing ability with respect to an image receiving material is good and it is difficult for the dye to become blurry; storability as an ink is excellent; there is no toxicity; purity is high; and the dye is available inexpensively. In particular, a dye which has a good yellow hue and excellent light fastness is desired. However, it is extremely difficult to find a dye which satisfies these requirements at high levels.

Various dyes and pigments have already been proposed for the ink jet and are used actually. However, under the present circumstances, a dye which satisfies all of the requirements has not yet been found. It is difficult for conventionally well-known dyes or pigments which are denoted by color index (C.I.) numbers to obtain both the hue and the light fastness which are required of inks for ink jets. Japanese Patent Application Laid-Open (JP-A) No. 2-212566 discloses an ink for ink jet which is aimed at obtaining both the hue and the light fastness. However, regarding the dyes which are used in JP-A-2-212566, the improvement of the hue and the light fastness are insufficient. The dyes described in JP-A-2-212566 also have a problem with regard to wet heat fastness. Further, JP-B-4-22714 discloses a thiaziazollyl-azo-pyrazole yellow dye as a dye for thermal transfer. However, solubility of this dye in an aqueous solution is insufficient, and therefore, the dye cannot be used as an aqueous ink for ink jet.

SUMMARY OF THE INVENTION

An object of the present invention is to solve the above-described problems. Namely, an object of the present invention is to provide a dye, an ink for ink jet recording, and an ink jet recording method, by which an image having good hue and light fastness can be formed.

Means for solving the above problems are as follows.

A first aspect of the present invention is an ink for ink jet recording which contains at least one dye which is represented by the following general formula (1):

General formula (1)

wherein A and B each independently represents heterocyclic group which may be substituted, and said dye has at least one ionic hydrophilic group in a molecule.

A second aspect of the present invention is a dye which is represented by the following general formula (2):

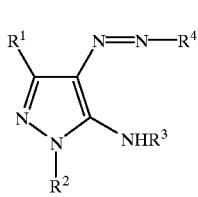

General Formula (2)

wherein $R^1$, $R^2$, and $R^3$ each independently represents one of a hydrogen atom, a halogen atom, a cyano group, an alkyl group, a cycloalkyl group, an aralkyl group, an aryl group, an alkylthio group, an arylthio group, and an ionic hydrophilic group; $R^4$ represents any heterocylic group which may be substituted and which is selected from the following Group 1 of heterocyclic groups; and the dye which is represented by the general formula has at least one ionic hydrophilic group in a molecule.

Group 1 of heterocyclic groups

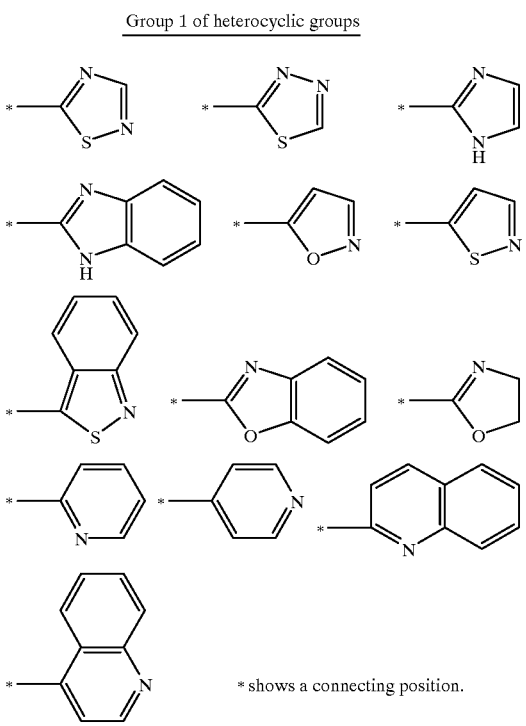

* shows a connecting position.

A third aspect of the present invention is a dye which is represented by the following general formula (3):

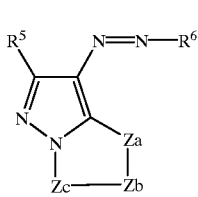

General Formula (3)

wherein, $R^5$ represents one of a hydrogen atom, a cyano group, an alkyl group, a cycloalkyl group, an aralkyl group, an aryl group, an alkylthio group, an arylthio group, and an ionic hydrophilic group; Za represents one of —N═, —NH— and —C ($R^{11}$)=; Zb and Zc each independently represents one of —N= and —C ($R^{11}$)=; $R^{11}$ represents one of a hydrogen group and a nonmetallic substituent; $R^6$ represents any heterocylic group which may be substituted and which is selected from the following Group 2 of heterocyclic groups; and the dye has at least one ionic hydrophilic group in a molecule.

Group 2 of heterocyclic groups

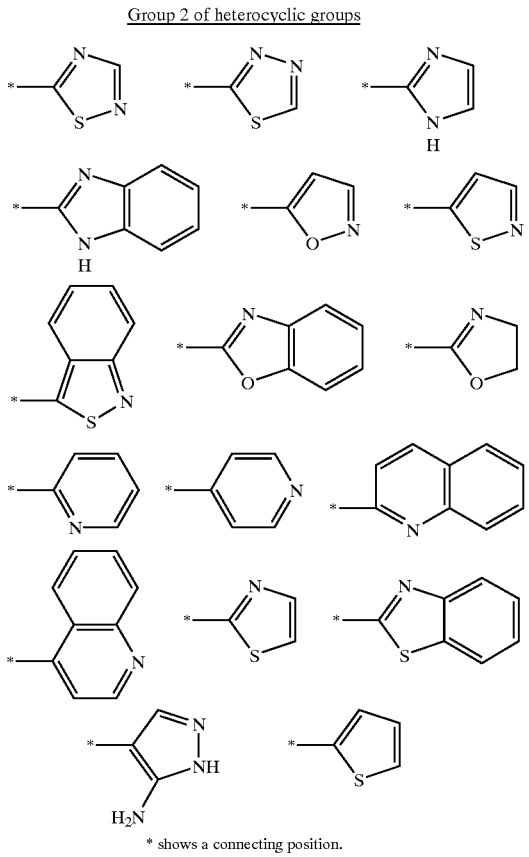

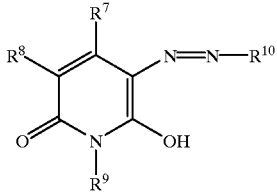

* shows a connecting position.

A fourth aspect of the present invention is a dye which is represented by the following general formula (4):

General Formula (4)

R⁷
R⁸    N=N—R¹⁰

O    N    OH
     R⁹ wherein $R^7$ and $R^9$ each independently represents one of a hydrogen atom, a cyano group, an alkyl group, a cycloalkyl group, an aralkyl group, an aryl group, an alkylthio group, an arylthio group, and an ionic hydrophilic group; $R^8$ represents one of a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxy group, and an ionic hydrophilic group; $R^{10}$ represents any heterocylic group which may be substituted and which is selected from the following Group 3 of heterocyclic groups; and the dye has at least one ionic hydrophilic group in a molecule.

Group 3 of heterocyclic groups

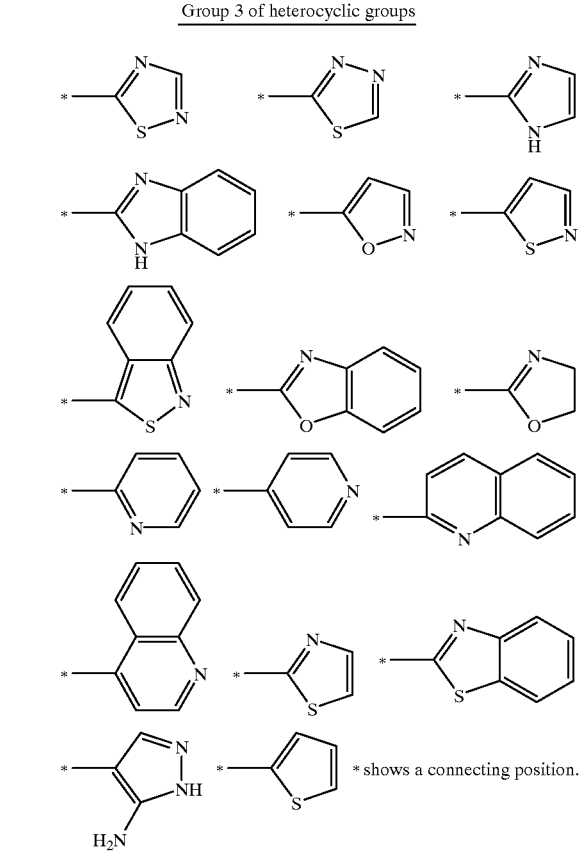

* shows a connecting position.

It should be noted that, when the compounds represented by the above general formulas (2), (3), and (4) have tautomers, the tautomers are also included in the scope of the present invention.

DESCRIPTION OF THE PREFERRED EMBODIMENTS

Ink for Ink Jet Recording

The ink for ink jet recording of the present invention contains the dyes which are represented by the above general formula (1). The dyes represented by the above general formula (1) have characteristics in which the light fastness is good and the hue is good. Among the dyes represented by the above general formula (1), in particular, a yellow dye has an absorption spectrum form in which the peak of absorption spectrum is sharp. Among the dyes represented by the above general formula (1), the yellow dye is preferable. Further, when a dye of the present invention is the yellow dye, the ratio ($I\lambda_{max+70}/I\lambda_{max}$) of absorbancy $I\lambda_{max}$ at $\lambda_{max}$ (nm) to absorbancy $I\lambda_{max+70}$ at $\lambda_{max+70}$ (nm) in the absorption spectrum of the aqueous solution thereof is 0.2 or less, is preferable.

In the above general formula (1), A and B each independently represents heterocyclic group which may be substituted. The substituent of the above-described heterocyclic groups includes at least one ionic hydrophilic group. As the heterocyclic group, the heterocyclic group which is formed by a five-membered ring or a six-membered ring is preferable. The heterocyclic group may form a monocyclic structure or polycyclic structure in which two or more rings are condensed. Moreover, as the heterocylic group, the heterocyclic group which includes at least any of an N atom, an O atom, and an S atom is preferable. A preferable example of the above heterocyclic group is shown below.

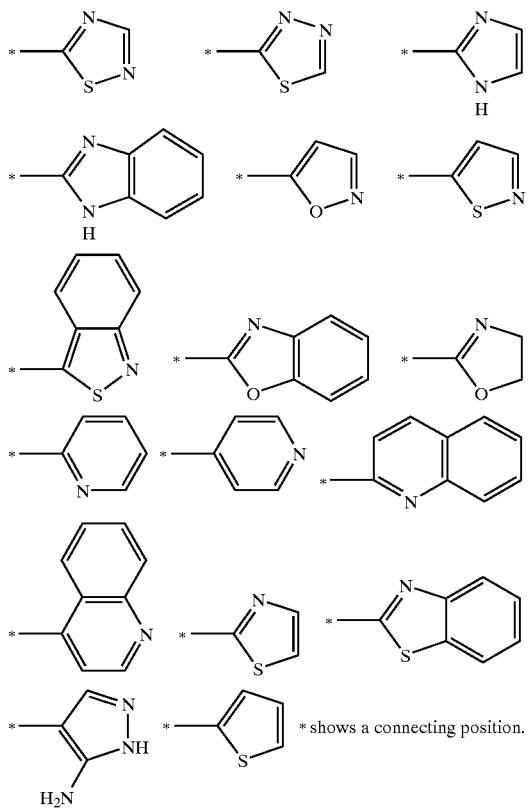

* shows a connecting position.

The dyes which are represented by the above general formula (1) contains at least one ionic hydrophilic group in a molecule. Since the above dyes have the ionic hydrophilic group in a molecule, solubility and/or dispersibility to an aqueous medium is good. The above-described ionic hydrophilic group includes a sulfo group, a carboxyl group, and a quaternary ammonium group. Above all, the sulfo group and the carboxyl group are preferable, and the sulfo group are particularly preferable. Moreover, it is preferable that the above-described dyes contain the two or more ionic hydrophilic groups in the molecule. In the case of containing the two or more ionic hydrophilic groups, a combination of the carboxyl group and the sulfo group is preferable. The above carboxyl group, the above sulfo group and the like may be in the state of salt. Examples of counter ion which forms the salt include an alkali metal ion (e.g., a sodium ion and a potassium ion) and an organic cation (e.g., a tetramethylguanidium ion).

Among the dyes represented by the above general formula (1), the dyes which are represented by the above general formulas (2) to (4) are preferable since the hue and the light fastness of the dyes are better.

In the above general formulas (2), (3), and (4), $R^1$, $R^2$, $R^3$, $R^5$, $R^7$, and $R^9$ each independently represents a hydrogen atom, a halogen atom, a cyano group, an alkyl group, a cycloalkyl group, an aralkyl group, an aryl group, an alkylthio group, an arylthio group, or an ionic hydrophilic group.

The alkyl group represented by $R^1$, $R^2$, $R^3$, $R^5$, $R^7$, and $R^9$ includes an alkyl group having at least one substituent and an alkyl group having no substituent. As the above-described alkyl group, an alkyl group having 1 to 12 carbon atoms is preferable. Examples of the above-described substituent include a hydroxyl group, an alkoxy group, a cyano group, a halogen atom, and an ionic hydrophilic group. Examples of the above-described alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by $R^1$, $R^2$, $R^3$, $R^5$, $R^7$, and $R^9$ includes a cycloalkyl group having at least one substituent and a cycloalkyl group having no substituent. As the above-described cycloalkyl group, a cycloalkyl group having 5 to 12 carbon atoms is preferable. An example of the above-described substituent includes an ionic hydrophilic group. An example of the above-described cycloalkyl group includes cyclohexyl.

The aralkyl group represented by $R^1$, $R^2$, $R^3$, $R^5$, $R^7$, and $R^9$ includes an aralkyl group having at least one substituent and an aralkyl group having no substituent. As the above-described aralkyl group, an aralkyl group having 7 to 12 carbon atoms is preferable. An example of the above-described substituent includes an ionic hydrophilic group. Examples of the above-described aralkyl group include benzyl and 2-phenethyl.

The aryl group represented by $R^1$, $R^2$, $R^3$, $R^5$, $R^7$, and $R^9$ includes an aryl group having at least one substituent and an aryl group having no substituent. As the above-described aryl group, an aryl group having 7 to 12 carbon atoms is preferable. Examples of the above-described substituent include an alkyl group, an alkoxy group, a halogen atom, an alkylamino group, and an ionic hydrophilic group. Examples of the above-described aryl group include phenyl, p-tolyl, p-methoxyphenyl, o-chlorophenyl, and m-(3-sulfopropylamino) phenyl.

The alkylthio group represented by $R^1$, $R^2$, $R^3$, $R^5$, $R^7$, and $R^9$ includes an alkylthio group having at least one substituent and an alkylthio group having no substituent. As the above-described alkylthio group, an alkylthio group having 1 to 12 carbon atoms is preferable. An example of the above-described substituent includes an ionic hydrophilic group. Examples of the above-described alkylthio group include methylthio and ethylthio.

The arylthio group represented by $R^1$, $R^2$, $R^3$, $R^5$, $R^7$, and $R^9$ includes an arylthio group having at least one substituent and an arylthio group having no substituent. As the above-described arylthio group, an arylthio group having 6 to 12 carbon atoms is preferable. Examples of the above-described substituent include an alkyl group and an ionic hydrophilic group. Examples of the above-described arylthio group include a phenylthio group and p-tolylthio.

The ionic hydrophilic group represented by $R^1$, $R^2$, $R^3$, $R^5$, $R^7$, and $R^9$ includes a sulfo group, a carboxyl group, and a quaternary ammonium group. Above all, the sulfo group and the carboxyl group are preferable, and the sulfo group are particularly preferable. The above-described carboxyl group and the above-described sulfo group may be in the state of salt. Examples of counter ion which forms the salt include an alkaline metal ion (e.g., a sodium ion and a potassium ion) and an organic cation (e.g., a tetramethylguanidium ion).

In the above general formula (4), $R^8$ represents a hydrogen atom, a halogen atom, an alkyl group, an alkoxy group, an aryl group, an aryloxy group, a cyano group, an acylamino group, a sulfonylamino group, an alkoxycarbonylamino group, an ureido group, an alkylthio group, an arylthio group, an alkoxycarbonyl group, a carbamoyl group, a sulfamoyl group, a sulfonyl group, an acyl group, an alkylamino group, an arylamino group, a hydroxy group, or an ionic hydrophilic group.

The halogen atom represented by $R^8$ includes a fluorine atom, a chlorine atom, and a bromine atom.

The alkyl group represented by $R^8$ includes an alkyl group having at least one substituent and an alkyl group having no substituent. As the above-described alkyl group, an alkyl group having 1 to 12 carbon atoms is preferable. Examples of the above-described substituent include a hydroxyl group, an alkoxy group, a cyano group, a halogen atom, and an ionic hydrophilic group. Examples of the above-described alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The alkoxy group represented by $R^8$ includes an alkoxy group having at least one substituent and an alkoxy group having no substituent. As the above-described alkoxy group, an alkoxy group having 1 to 12 carbon atoms is preferable. Examples of the above-described substituent include a hydroxyl group and an ionic hydrophilic group. Examples of the above-described alkoxy group include methoxy, ethoxy, isopropoxy, methoxyethoxy, hydroxyethoxy, and 3-carboxypropoxy.

The aryl group represented by $R^8$ includes an aryl group having at least one substituent and an aryl group having no substituent. As the above-described aryl group, an aryl group having 7 to 12 carbon atoms is preferable. Examples of the above-described substituent include an alkyl group, an alkoxy group, a halogen atom, an alkylamino group, and an ionic hydrophilic group. Examples of the above-described aryl group include phenyl, p-tolyl, p-methoxyphenyl, o-chlorophenyl, and m-(3-sulfopropylamino) phenyl.

The aryloxy group represented by $R^8$ includes an aryloxy group having at least one substituent and an aryloxy group having no substituent. As the above-described aryloxy group, an aryloxy group having 6 to 12 carbon atoms is preferable. Examples of the above-described substituent include an alkoxy group and an ionic hydrophilic group. Examples of the above-described aryloxy group include phenoxy, p-methoxyphenoxy, and o-methoxyphenoxy.

The acylamino group represented by $R^8$ includes an acylamino group having at least one substituent and an acylamino group having no substituent. As the above-described acylamino group, an acylamino group having 2 to 12 carbon atoms is preferable. An example of the above-described substituent includes an ionic hydrophilic group. Examples of the above-described acylamino group include acetamide, propyonamide, benzamide, and 3,5-disulfobenzamide.

The sulfonylamino group represented by $R^8$ includes a sulfonylamino group having at least one substituent and a sulfonylamino group having no substituent. As the above-described sulfonylamino group, a sulfonylamino group having 2 to 12 carbon atoms is preferable. Examples of the above-described sulfonylamino group include methylsulfonylamino and ethylsulfonylamino.

The alkoxycarbonylamino group represented by $R^8$ includes an alkoxycarbonylamino group having at least one substituent and an alkoxycarbonylamino group having no substituent. As the above-described alkoxycarbonylamino group, an alkoxycarbonylamino group having 2 to 12 carbon atoms is preferable. An example of the above-described substituent includes an ionic hydrophilic group. An example of the above-described alkoxycarbonylamino group includes ethoxycarbonylamino.

The ureido group represented by $R^8$ includes an ureido group having at least one substituent and an ureido group having no substituent. As the above-described ureido group, an ureido group having 1 to 12 carbon atoms is preferable. Examples of the above-described substituent include an alkyl group and an aryl group. Examples of the above-described ureido group include 3-methylureido, 3,3-dimethylureido, and 3-phenylureido.

The alkylthio group represented by $R^8$ includes an alkylthio group having at least one substituent and an alkylthio group having no substituent. As the above-described alkylthio group, an alkylthio group having 1 to 12 carbon atoms is preferable. An example of the above-described substituent includes an ionic hydrophilic group. Examples of the above-described alkylthio group include methylthio and ethylthio.

The arylthio group represented by $R^8$ includes an arylthio group having at least one substituent and an arylthio group having no substituent. As the above-described arylthio group, an arylthio group having 6 to 12 carbon atoms is preferable. Examples of the above-described substituent include an alkyl group and an ionic hydrophilic group. Examples of the above-described arylthio group include phenylthio and p-tolylthio.

The alkoxycarbonyl group represented by $R^8$ includes an alkoxycarbonyl group having at least one substituent and an alkoxycarbonyl group having no substituent. As the above-described alkoxycarbonyl group, an alkoxycarbonyl group having 2 to 12 carbon atoms is preferable. An example of the above-described substituent includes an ionic hydrophilic group. Examples of the above-described alkoxycarbonyl group include methoxycarbonyl and ethoxycarbonyl.

The carbamoyl group represented by $R^8$ includes a carbamoyl group having at least one substituent and a carbamoyl group having no substituent. An example of the above-described substituent includes an alkyl group. Examples of the above-described carbamoyl group include methylcarbamoyl and dimethylcarbamoyl.

The sulfamoyl group represented by $R^8$ includes a sulfamoyl group having at least one substituent and a sulfamoyl group having no substituent. An example of the above-described substituent includes an alkyl group. Examples of the above-described sulfamoyl group include an dimethylsulfamoyl group and a di-(2-hydroxyethyl) sulfamoyl group.

Examples of the sulfonyl group represented by $R^8$ include methanesulfonyl and phenylsulfonyl.

The acyl group represented by $R^8$ includes an acyl group having at least one substituent and an acyl group having no substituent. As the above-described acyl group, an acyl group having 1 to 12 carbon atoms is preferable. An example of the above-described substituent includes an ionic hydrophilic group. Examples of the above-described acyl group include acetyl and benzoyl.

The alkylamino group represented by $R^8$ includes an alkylamino group having at least one substituent and an alkylamino group having no substituent. As the above-described alkylamino group, an alkylamino group having 1 to 6 carbon atoms is preferable. An example of the above-described substituent includes an ionic hydrophilic group. Examples of the above-described alkylamino group include methylamino and dimethylamino.

The arylamino group represented by $R^8$ includes an arylamino group having at least one substituent and an arylamino group having no substituent. As the above-described arylamino group, an arylamino group having 6 to 12 carbon atoms is preferable. Examples of the above-described substituent include a halogen atom and an ionic hydrophilic group. Examples of the above-described arylamino group include anilino and 2-chloroanilino.

The ionic hydrophilic group represented by $R^8$ includes a sulfo group, a carboxyl group, and a quaternary ammonium group. Above all, the sulfo group and the carboxyl group are preferable, and the sulfo group are particularly preferable. The above-described carboxyl group, the above-described sulfo group and the like may be in the state of salt. Examples of counter ion which forms the salt include an alkaline metal ion (e.g., a sodium ion and a potassium ion) and an organic cation (e.g., a tetramethylguanidium ion).

In the above general formula (3), Za represents —N=, —NH— or —C($R^{11}$)=, and Zb and Zc each independently represents —N= or —C ($R^{11}$)=, and $R^{11}$ represents a hydrogen atom or a nonmetallic substituent. As the nonmetallic substituent represented by $R^{11}$, a cyano group, a cycloalkyl group, an aralkyl group, an aryl group, an alkylthio group, an arylthio group, or an ionic hydrophilic group is preferable. The above-described respective substituents are synonymous with the respective substituents represented by $R^1$, and preferable examples are also synonymous with the examples thereof. The skeletal example of a heterocycle which is included in the above general formula (3) and which is formed by two five-membered rings is described below.

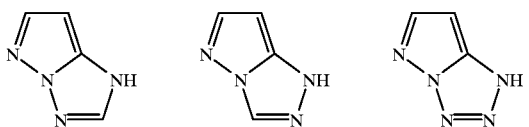

In the above general formula (2), $R^4$ represents any heterocylic group which may be substituted and which is selected from the above-described Group 1 of heterocyclic groups. The substituent includes an ionic hydrophilic group, an alkyl group having 1 to 12 carbon atoms, an aryl group, an alkylthio or arylthio group, a halogen atom, a cyano group, a sulfamoyl group, a sulfonamino group, a carbamoyl group, an acylamino group, and the like. The above-described alkyl group, the above-described aryl group, and the like may have another substituent. Among the heterocycic group shown in Group 1, imidazole, 1,2,4-thiadiazoleand 1,3,4-thiadiazole are preferable.

In the above general formula (3), $R^6$ represents any heterocylic group which may be substituted and which is selected from the above-described Group 2 of heterocyclic groups. The substituent includes an ionic hydrophilic group, an alkyl group having 1 to 12 carbon atoms, an aryl group, an alkylthio or arylthio group, a halogen atom, a cyano group, a sulfamoyl group, a sulfonamino group, a carbamoyl group, an acylamino group, and the like. The above-described alkyl group, the above-described aryl group, and the like may have another substituent. Among the heterocycic group shown in Group 2, imidazole, 1,2,4-thiadiazole, 1,3,4-thiadiazole, benzothiazole, and benzooxazole are preferable.

In the above general formula (4), $R_{10}$ represents any heterocylic group which may be substituted and which is selected from the above-described Group 3 of heterocyclic groups. The substituent includes an ionic hydrophilic group, an alkyl group having 1 to 12 carbon atoms, an aryl group, an alkylthio or arylthio group, a halogen atom, a cyano group, a sulfamoyl group, a sulfonamino group, a carbamoyl group, an acylamino group, and the like. The above-described alkyl group, the above-described aryl group, and the like may have another substituent. Among the heterocycic group shown in Group 3, imidazole, 1,2,4-thiadiazole, 1,3,4-thiadiazole, benzothiazole, and benzooxazole are preferable.

The dyes which are represented by the above general formulas (2) to (4) contain at least one ionic hydrophilic group in a molecule. As examples, there are dyes in which at least one of $R^1$, $R^2$, $R^3$, $R^5$, $R^7$, $R^8$ and $R^9$ in the above general formulas (2) to (4) is ionic hydrophilic group. Further, there are dyes in which $R^1$, $R^2$, $R^3$, $R^5$, $R^7$, $R^8$ and $R^9$ in the above general formulas (2) to (4) are ionic hydrophilic groups. In addition, there are dyes in which at least one of $R^1$ to $R^{11}$ in the above general formulas (2) to (4) have at least one ionic hydrophilic group as substituent. In this way, since the dyes have the ionic hydrophilic group in a molecule, solubility and/or dispersibility to the aqueous medium is good. The above-described ionic hydrophilic group includes a sulfo group, a carboxyl group, and a quaternary ammonium group. Above all, the sulfo group and the carboxyl group are preferable, and the sulfo group are particularly preferable. Moreover, the above-described dyes may contain the two or more ionic hydrophilic groups in the molecule. In the case of containing the two or more ionic hydrophilic groups, a combination of the carboxyl group and the sulfo group is preferable. The above carboxyl group, the above sulfo group and the like may be in the state of salt. Examples of counter ion which forms the salt include an alkaline metal ion (e.g., a sodium ion and a potassium ion), and an organic cation (e.g., a tetramethylguanidium ion).

Hereinafter, description is given of concrete examples of the dyes represented by the general formula (1) (i.e., concrete examples of the dyes represented by the general formula (2) (1-1 to 1-16), concrete examples of the dyes represented by the general formula (3) (2-1 to 2-20), and concrete examples of the dyes represented by the general formula (4) (3-1 to 3-12)). However, the dyes used in the present invention are not limited to those in the following concrete examples.

1-1

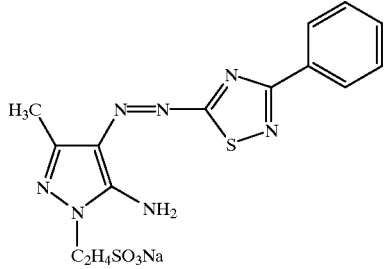

1-2

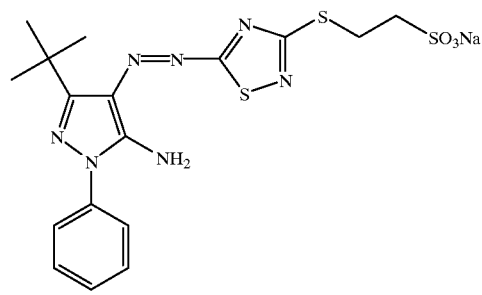

1-3

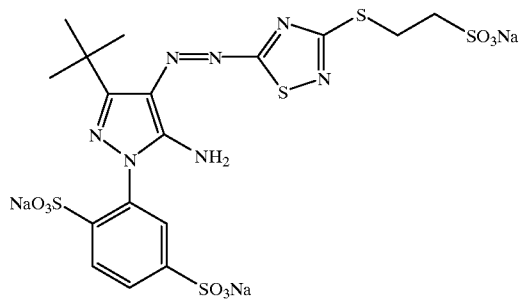

-continued
1-4
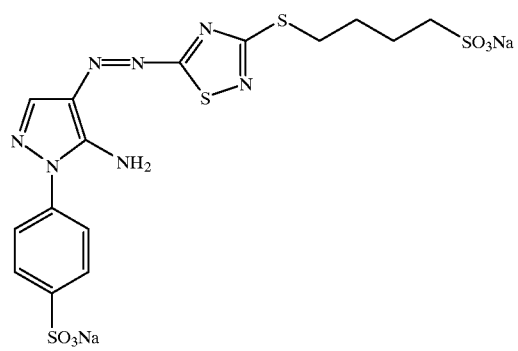
1-5
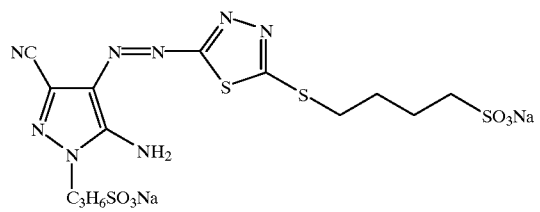
1-6
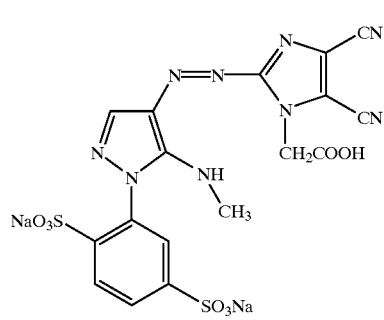
1-7
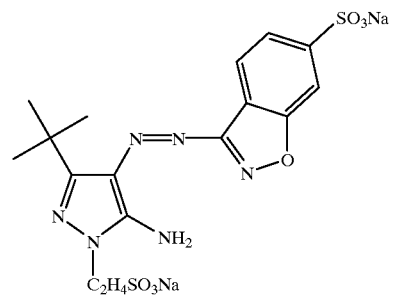
1-8
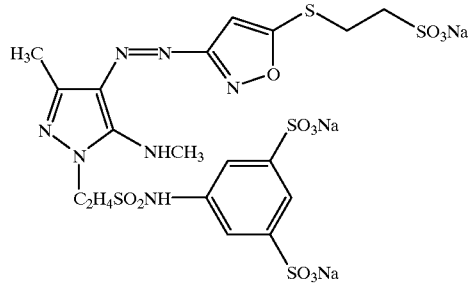
-continued
1-9
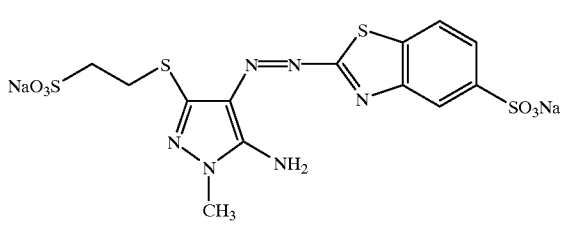
1-10
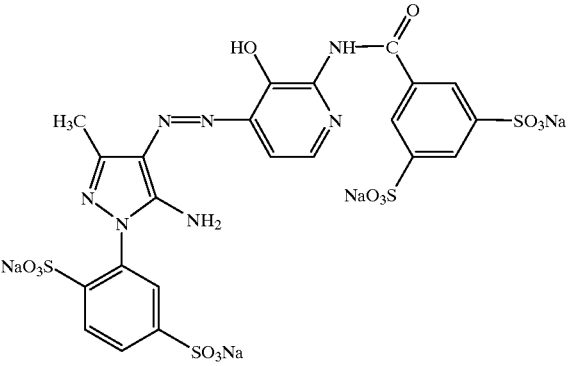
1-11
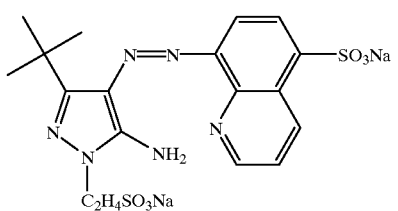
1-12
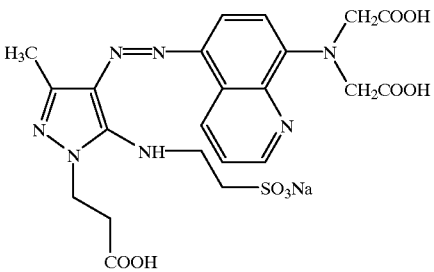
1-13
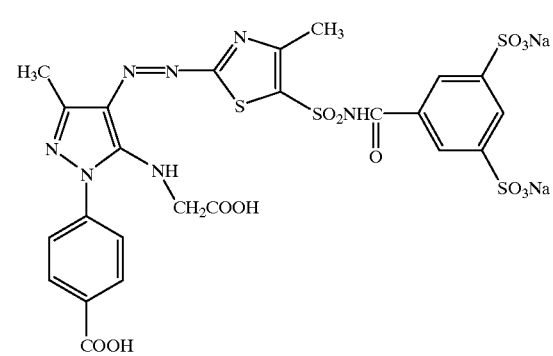

-continued
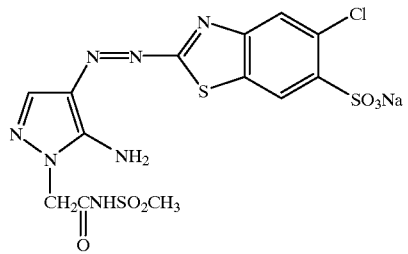
1-14
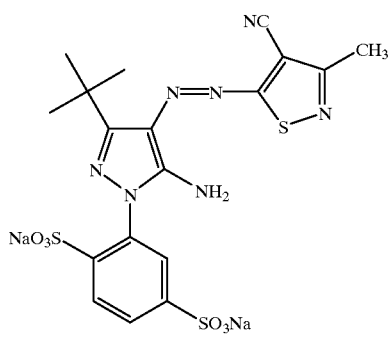
1-15
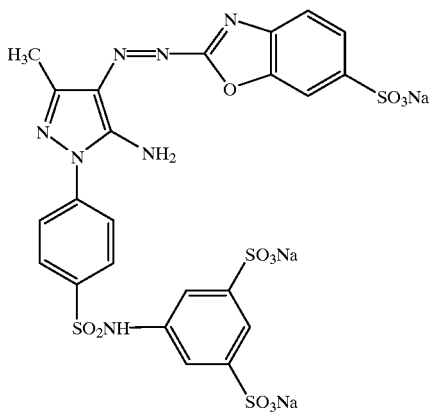
1-16
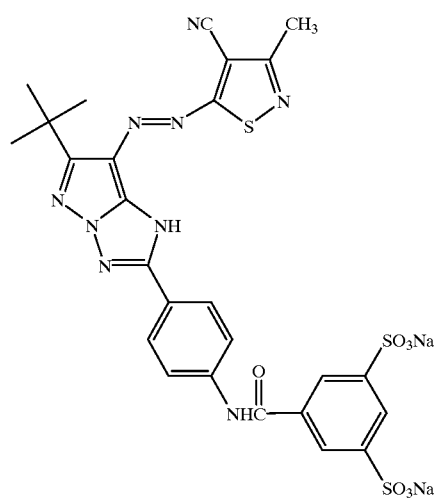
2-1
-continued
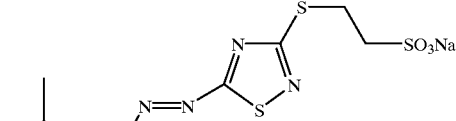
2-2
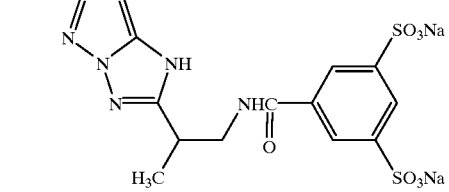
2-3
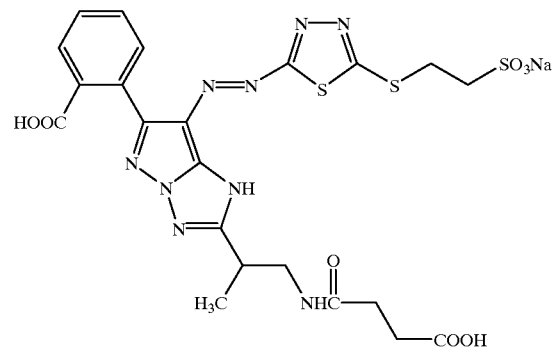
2-4
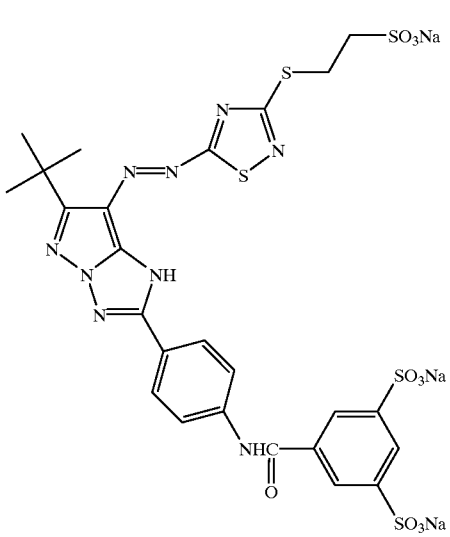
2-5
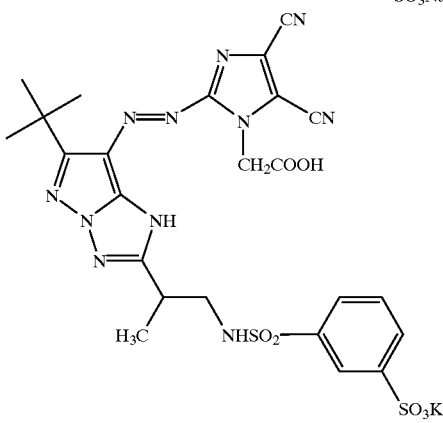

-continued
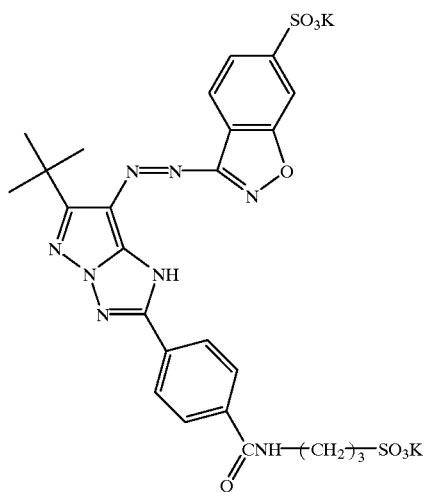
2-6
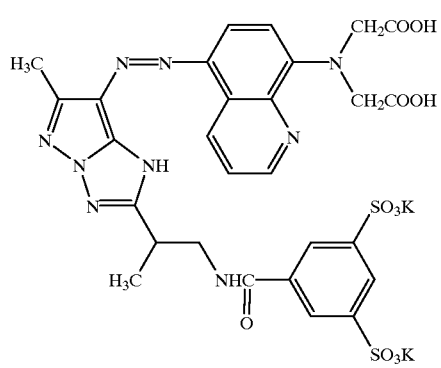
2-7
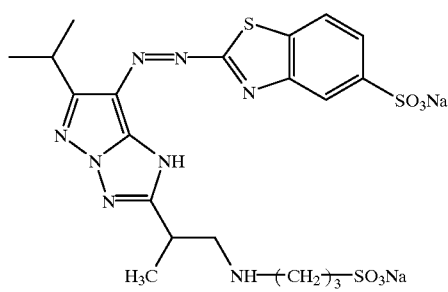
2-8
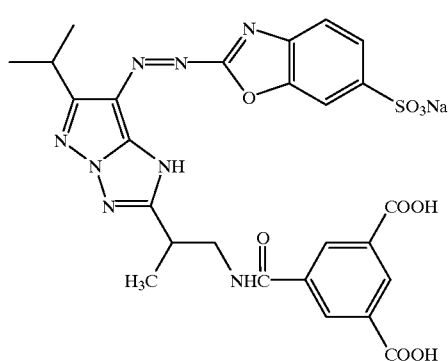
2-9
-continued
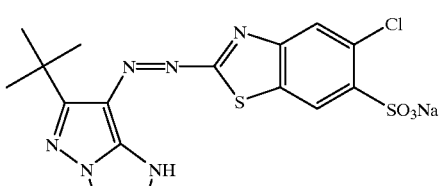
2-10
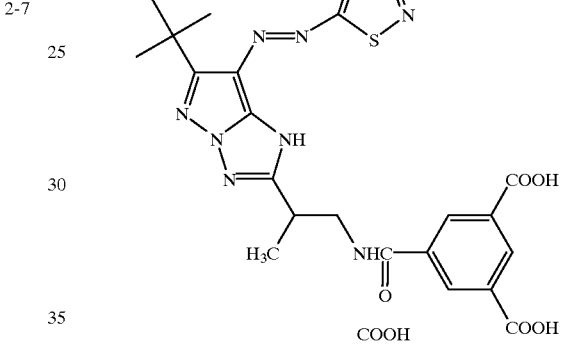
2-11
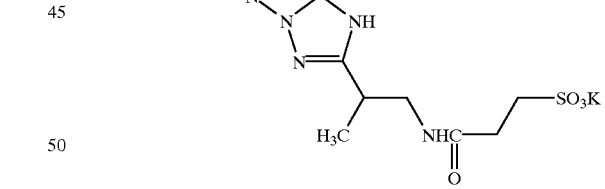
2-12
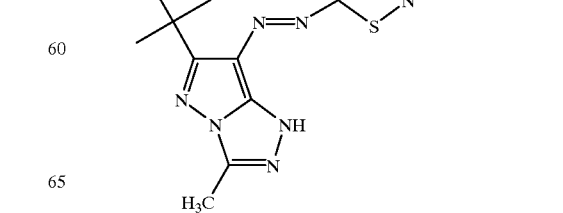
2-13

-continued
2-14
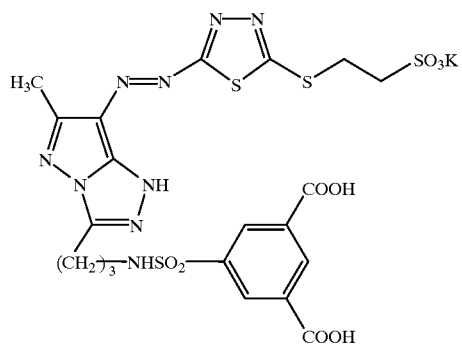
2-15
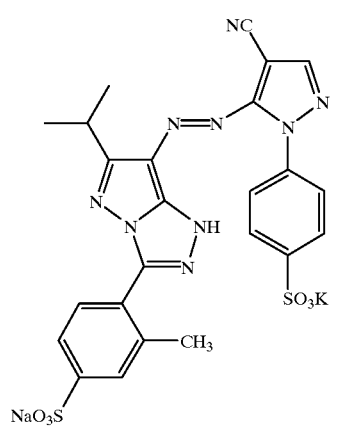
2-16
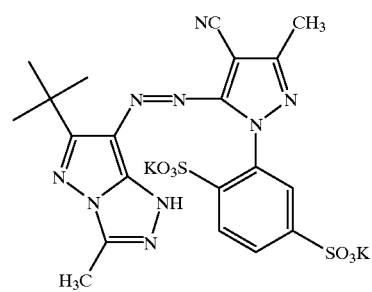
2-17
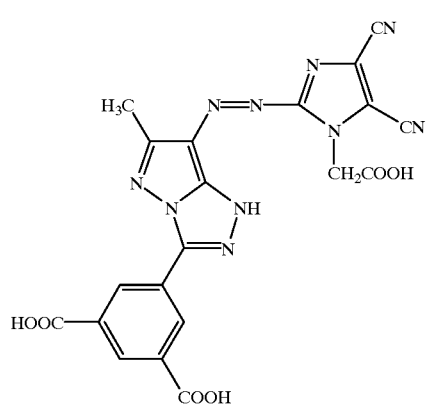
-continued
2-18
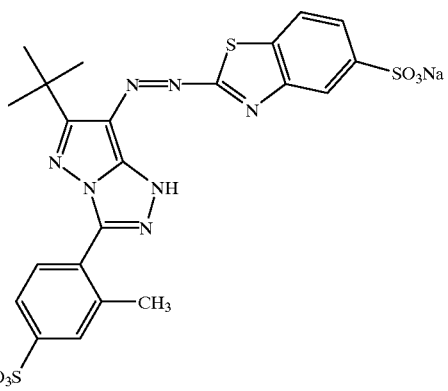
2-19
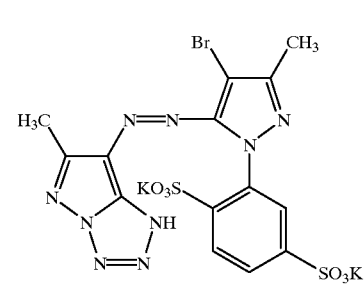
2-20
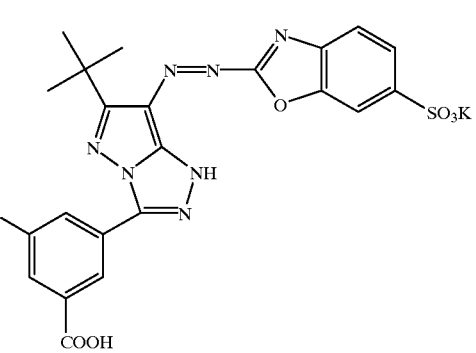
3-1
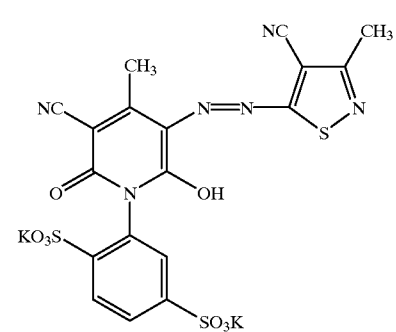
3-2
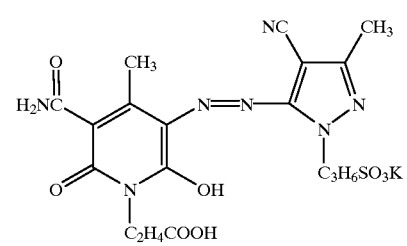

-continued
3-3
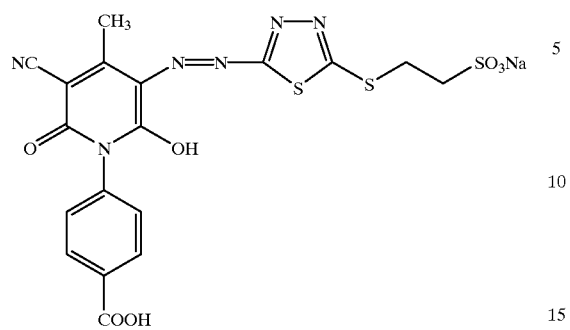
3-4
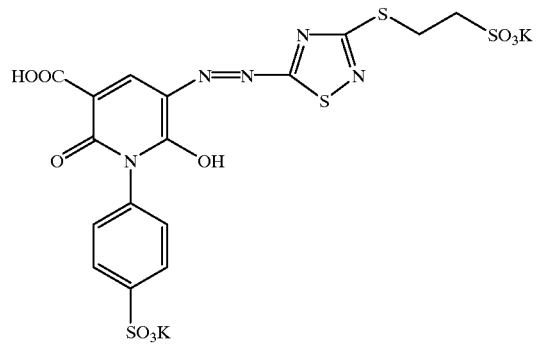
3-5
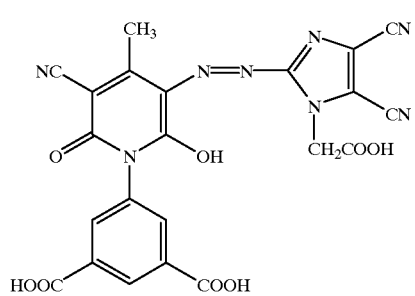
3-6
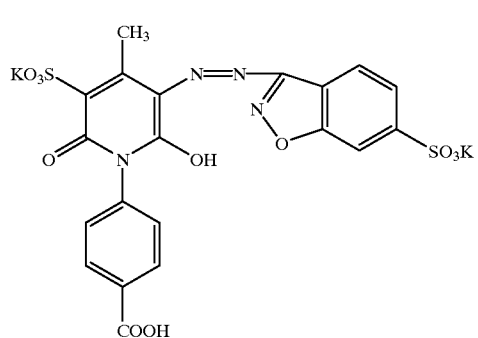
-continued
3-7
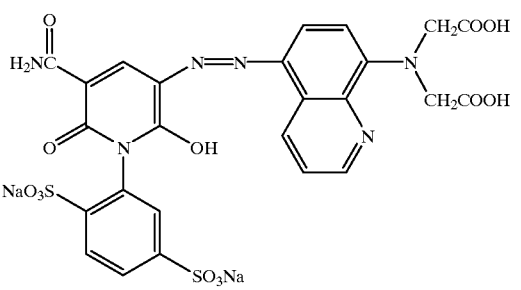
3-8
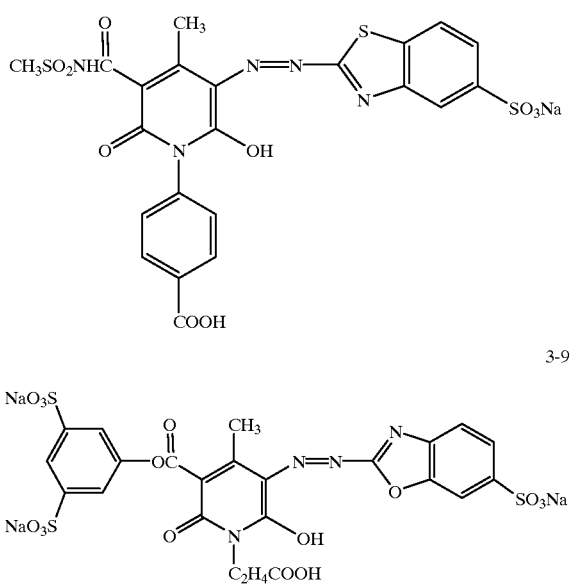
3-9
3-10
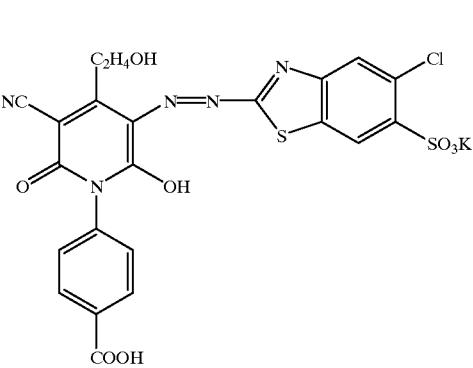
3-11
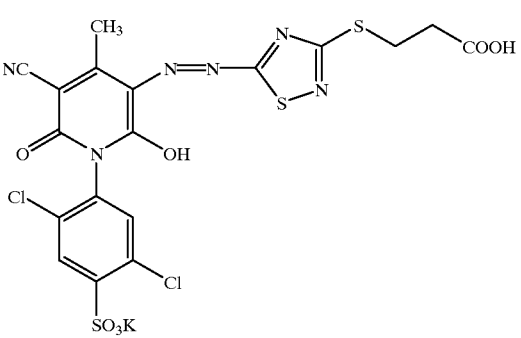

-continued

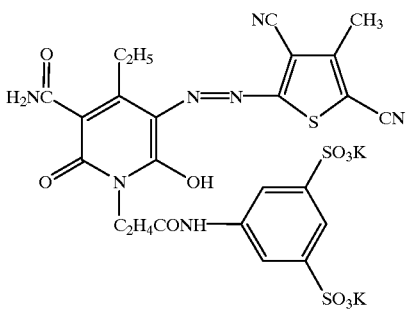

3-12

The dyes represented by the above general formulas (1), (2), (3), and (4) can be synthesized by the coupling reaction of a diazo component and a coupler component. Synthesizing examples of the dyes represented by the above general formulas (2), (3), and (4) are shown below. The following synthesizing examples are an example in which a formula (A-1) is used as the diazo component and a formula (B-1) is used as the coupler component, an example in which a formula (A-2) is used as the diazo component and a formula (B-2) is used as the coupler component, and an example in which a formula (A-3) is used as the diazo component and a formula (B-3) is used as the coupler component.

Synthesizing Example of Dye 1-3

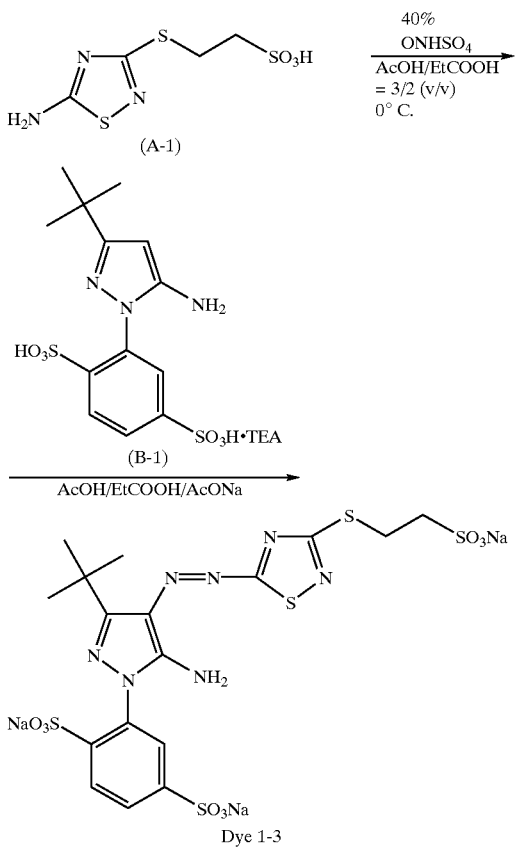

1 g of the diazo component A-1 was dissolved in 10 milliliter of a mixed solvent in which the volume ratio of acetic acid to propionic acid is 3:2. While the liquid temperature was held at 0° C., 40% ONHSO$_4$ as further added to the solution. The solution was added while stirring to a solution, in which 891 mg of the coupler component B-1 was dissolved into 15 milliliter of a mixed solvent of acetic acid, propionic acid, and sodium acetate. The mixed solution was reacted at 0° C. for an hour, and thereby a yellow precipitate was obtained. The precipitate was isolated by filtration and recrystallized by acetonitrile. Accordingly, 1.5 g of the dye 1-3 was obtained. The yield was 75%. $\lambda_{max}$= 453.2 nm (in DMF).

Synthesizing Example of Dye 2-1

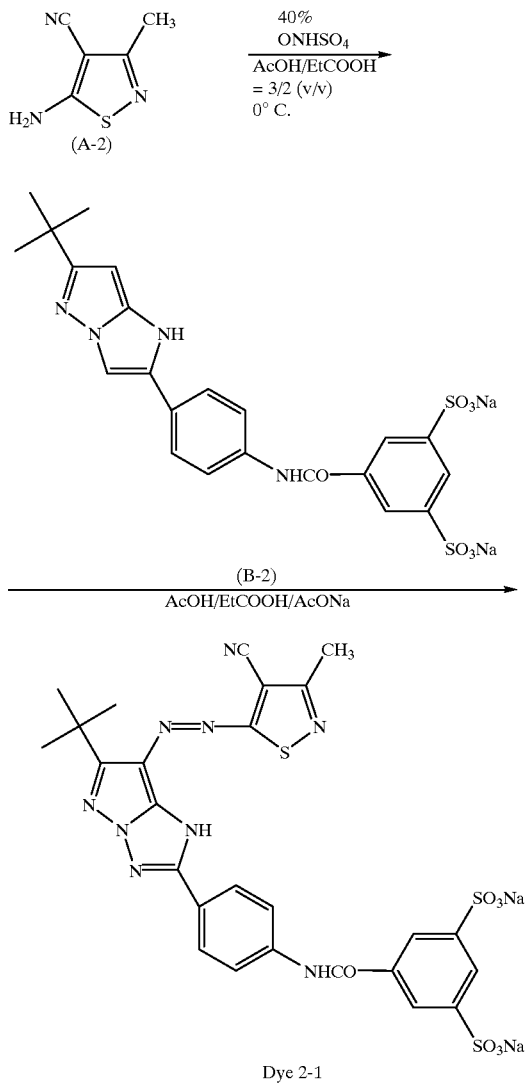

1 g of the diazo component A-2 was dissolved in 18 milliliter of a mixed solvent in which the volume ratio of acetic acid to propionic acid is 3:2. While the liquid temperature was held at 0° C., 40% ONHSO$_4$ was further added to the solution. The solution was added while stirring to a solution, in which 4 g of the coupler component B-2 was dissolved into 26 milliliter of a mixed solvent of acetic acid, propionic acid, and sodium acetate. The mixed solution was reacted at 0° C. for an hour, and thereby a yellow precipitate was obtained. The precipitate was isolated by filtration and recrystallized by methanol. Accordingly, 3.5 g of the dye 2-1 was obtained. The yield was 68%. $\lambda_{max}$=445.3 nm (in DMF).

Synthesizing Example of Dye 3-3

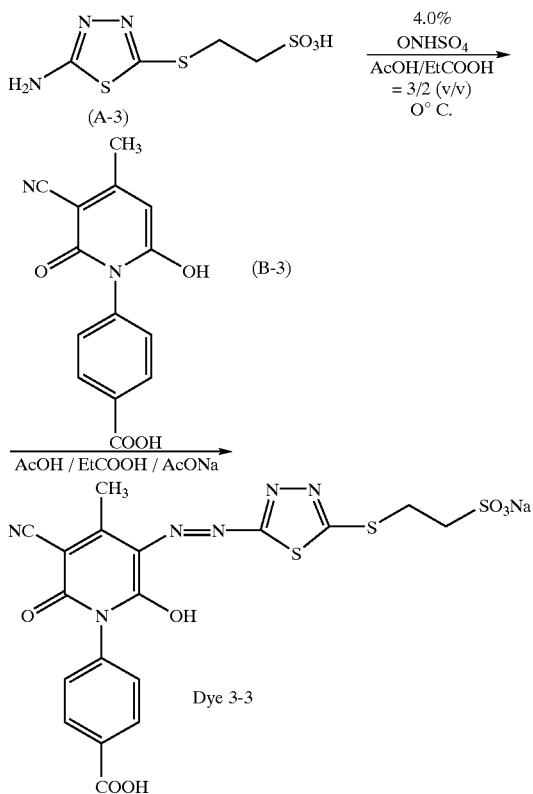

1 g of the diazo component A-3 was dissolved in 10 milliliter of a mixed solvent in which the volume ratio of acetic acid to propionic acid is 3:2. While the liquid temperature was held at 0° C., 40% ONHSO$_4$ was further added to the solution. The solution was added while stirring to a solution, in which 1.1 g of the coupler component B-3 was dissolved into 15 milliliter of a mixed solvent of acetic acid, propionic acid, and sodium acetate. The mixed solution was reacted at 0° C. for an hour, and thereby a yellow precipitate was obtained. The precipitate was isolated by filtration and recrystallized by ethanol. Accordingly, 1.3 g of the dye 3-3 was obtained. The yield was 60%. $\lambda_{max}$=455.5 nm (in DMF).

Following dyes were prepared in the same way as in the above synthesizing Examples, except that the types and amounts of the diazo component and the coupler component were replaced. The yield and A max thereof are shown in following Table 1.

TABLE 1

| Dye | Yield (%) | $\lambda_{max}$ (nm) |
|---|---|---|
| 1-5 | 68 | 448.3 |
| 1-6 | 70 | 460.2 |
| 1-7 | 76 | 461.3 |
| 1-8 | 82 | 458.1 |
| 1-9 | 64 | 462.8 |
| 1-10 | 59 | 449.0 |
| 1-13 | 72 | 455.2 |
| 1-15 | 73 | 456.3 |
| 1-16 | 69 | 465.4 |
| 2-2 | 88 | 443.3 |
| 2-3 | 82 | 444.2 |
| 2-4 | 78 | 450.9 |
| 2-5 | 75 | 448.9 |
| 2-10 | 76 | 452.7 |

The ink for inject recording of the present invention can be prepared by dissolving and/or dispersing the above dyes in an aqueous medium. When the above dyes are dispersed in the aqueous medium, it is preferable that a disperser (e.g., a ball mill, a sand mill, an attriter, a roll mill, an agitator mill, a Henschel mixer, a colloid mill, an ultrasonic homogenizer, a pearl mill, a jet mill, or an Ang mill) is used and that the above dyes are dispersed in the state of particulates. After the above dyes are dissolved into an appropriate organic solvent, the obtained solution may be emulsified and dispersed in the aqueous medium. When the solution is emulsified and dispersed, a dispersing agent (emulsifying agent) or a surface active agent can be used. Japanese Patent Application Laid-Open (JP-A) No. 5-148436, JP-A-5-295312, JP-A-7-97541, JP-A-7-82515, and JP-A-7-118584 disclose the details of a method of preparing an aqueous ink for inkjet. The method is applicable to the preparation of the ink for ink jet recording of the present invention.

The main component of the above aqueous medium which is used in the ink for ink jet recording of the present invention is water. If desired, a mixture to which a water miscible organic solvent is added to the water can be used. Examples of the water miscible organic solvent include: alcohol (e.g., methanol, ethanol, propanol, isopropanol, butanol, isobutanol, sec-butanol, t-butanol, pentanol, hexanol, cyclohexanol, and benzyl alcohol); polyhydric alcohols (e.g., ethylene glycol, diethylene glycol, triethylene glycol, polyethylene glycol, propylene glycol, dipropylene glycol, polypropylene glycol, butylene glycol, hexandiol, pentanediol, glycerin, hexanetriol, and thiodiglycol); glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ehter, ethylene glycol diacetate, ethylene glycol monomethyl ether acetate, triethylene glycol monomethyl ether, triethylene glycol monoethyl ether, and ethylene glycol monophenyl ether); amines (e.g., ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine, and tetramethylpropylenediamine); and other polar solvents (e.g., formamide, N,N-dimethylformamide, N,N-dimethylacetamide, dimethylsulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). It should be noted that the above-described water miscible organic solvents may be used in combination of two or more.

It is preferable that the ink for ink jet recording of the present invention contains 0.2 parts by weight or more to 10 parts by weight or less of the above dye in 100 parts by weight of ink. It is more preferable that the ink contains 1 part by weight or more to 8 parts by weight or less of the dye, and is even more preferable that the ink contains 3 parts by weight or more to 6 parts by weight or less of the dye. The dyes contained in the ink for ink jet recording of the present invention may be one or two or more. For example, the dyes represented by the above general formula (1) may be used in combination of two or more (e.g., the respective dyes represented by the above general formulas (2), (3), and (4) may be used in combination of two or more). Moreover, in addition to the dyes represented by the above general formula (1), other dyes may be used. When the dyes are used in combination of two or more, the sum of the content of the dyes is preferably within the above ranges.

The viscosity of the ink for ink jet recording of the present invention is preferably 40 cp or less. Further, the surface tension of the ink is preferably 20 dyn/cm or more to 100 dyn/cm or less. The viscosity and the surface tension of the ink can be adjusted by adding various types of additive agents, e.g., a viscosity adjusting agent, a surface tension adjusting agent, a specific resistance adjusting agent, a membrane adjusting agent, an ultraviolet absorbing agent, an antioxidant, a fading inhibiting agent, an antimold, a rust preventing agent, a dispersing agent, and a surface active agent.

The ink for ink jet recording of the present invention can be used not only for forming a monochrome image but also for forming a full color image. In order to form the full color image, a magenta color ink, a cyan color ink, and a yellow color ink can be used. Moreover, in order to adjust the colors, a black color ink may be further used.

Ink Jet Recording Method

An ink jet recording method of the present invention is an ink jet recording method in which energy is supplied to the above-described ink of the present invention, droplets of the above ink are discharged onto an image receiving material, and an image is recorded on the image receiving material. The above-described image receiving material includes a plain paper, a coat paper, a plastic film, or the like. Because the image quality and the image storing durability improve, it is preferable that the coat paper is used as the image receiving material.

As the above-described image receiving material, it is preferable to use a recording paper which contains a polymer mordant. The polymer mordant is described in the respective specifications of Japanese Patent Application Laid-Open (JP-A) No. 48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. No. 2,484,430, U.S. Pat. No. 2,548,564, U.S. Pat. No. 3,148,061,U.S. Pat. No. 3,309,690, U.S. Pat. No. 4,115,124, U.S. Pat. No. 4,124,386, U.S. Pat. No. 4,193,800, U.S. Pat. No. 4,273,853, U.S. Pat. No. 4,282,305, and U.S. Pat. No. 4,450,224. The image receiving material containing a polymer mordant which is described in JP-A-1-161236 (pages 212–215) is particularly preferable. When the polymer mordant described in JP-A-1-161236 is used, an image having excellent image quality is obtained and the light resistance of the image improves.

In the ink jet recording method of the present invention, an image receiving material which contains an inorganic pigment can be used as the above image receiving material. Examples of the inorganic pigment include a silica pigment, an alumina pigment, a titanium dioxide pigment, a zinc oxide pigment, a zirconium oxide pigment, a micaceous iron oxide, a white lead, a lead oxide pigment, a cobalt oxide pigment, a strontium chromate, a molybdenum pigment, smectite, a magnesium oxide pigment, a calcium oxide pigment, a calcium carbonate pigment, and a mullite. The inorganic pigments may be used in combination of two or more.

In the ink jet recording method of the present invention, it is preferable that the above-described image receiving material has a hydrophilic layer including a hydrophilic binder as an ink receiving layer. A high water-absorbing polymer is preferably used as the hydrophilic binder. Examples of the hydrophilic binder include gelatin, gelatin derivatives, polyvinyl alcohol, polyvinyl alcohol derivatives, polyalkylene oxide, and polyalkylene oxide derivatives. The hydrophilic binder is described in JP-A-1-161236 (pages 215–222). It is preferable that the above-described ink receiving layer is cured by adding a hardening agent. The materials described in JP-A-1-161236 (page 222) can be used for the hardening agent.

In the ink jet recording method of the present invention, it is preferable that the above image receiving material contains a matting agent. The above-described matting agent is described in JP-A-1-161236 (pages 263–264). A surface active agent may be added to a constitutive layer(s) of the image receiving material in the ink jet recording method. The surface active agent serves as coating auxiliaries, a peelability improving agent, a slidability improving agent, or an antistatic agent. The surface active agent is described in JP-A-62-173463 and JP-A-62-183457. Instead of the surface active agent, an organic fluoro compound may be used. The organic fluoro compound is preferably hydrophobic. Examples of the organic fluoro compound include a fluorine containing surface active agent, an oiled fluorine containing compound (e.g., fluorine oil), and a solid fluorine contained compound resin (e.g., a tetrafluoroethylene resin). The organic fluoro compound is described in JP-A-57-9053 (the eighth to seventeenth columns), JP-A-61-20994, and JP-A-62-135826.

In the ink jet recording method of the present invention, a polymer latex may be added to the constitutive layer(s) (including a back layer) of the image receiving material. The polymer latex is used for the purpose of dimensional stability, curl prevention, adhesion prevention, membrane physical property improvement such as preventing cracks of a membrane. The polymer latex is described in JP-A-62-245258, JP-A-62-1316648, and JP-A-62-110066. When the polymer latex having a low glass transition temperature (40° C. or lower) is added to the layer containing a mordant, cracks or curls of the layer can be prevented. Further, when the polymer latex having a high glass transition temperature is added to the back layer, curls can be prevented. A fading inhibiting agent may be added to the constitutive layer(s) of the above-described image receiving material. The fading inhibiting agent includes an antioxidant, an ultraviolet absorbing agent, and a metal complex. The fading inhibiting agent is described in JP-A-1-161236 (pages 225–247). A fluorescent whitening agent may be added to the above image receiving material. The fluorescent whitening agent can be added to the ink of the present invention and supplied to the image receiving material from the exterior.

When the above-described image receiving material includes a supporting body and an ink receiving layer, a paper whose both sides are laminated with polyolefin (e.g., polyethylene, polystyrene, polyethylene terephthalate, polybutene, and the copolymers thereof) and a plastic film are preferably used in particular as the above-described supporting body. It is preferable that a white pigment (e.g., titanium oxide and zinc oxide) or a coloring dye (e.g., cobalt blue, ultramarine blue, and neodymium oxide) is added to the polyolefin.

The ink jet recording method of the present invention may be any of a continuous type and an on-demand type. Moreover, the technique of supplying energy to the ink is not particularly limited as well, and may be any of a bubble jet technique, a thermal jet technique, and a technique using ultrasonic waves.

The ink jet recording method of the present invention includes a technique in which a plurality of inks called "photo inks" having low concentrations are injected at small volumes, a technique in which the image quality is improved using a plurality of inks having substantially the same hues and different concentrations, and a technique which uses an achromatic transparent ink. The present invention achieves

EXAMPLES

Example 1
Preparation of Aqueous Ink

The following components were stirred for one hour while heating the components at 30° C. to 40° C. Thereafter, the components were pressurized and filtered using a micro filter having an average pore diameter of 0.8μ and a diameter of 47 mm. The ink solution was thereby prepared.

| | |
|---|---|
| dye (illustrative compound 1–3) | 4 parts by weight |
| diethylene glycol | 9 parts by weight |
| tetraethylene glycol monobutyl ether | 9 parts by weight |
| glycerin | 7 parts by weight |
| diethanolamine | 1 part by weight |
| water | 70 parts by weight |

Example 2
Except that the dye was replaced with a dye (illustrative compound 1-5), the ink solution was prepared in the same way as in Example 1.

Example 3
Except that the dye was replaced with a dye (illustrative compound 2-4), the ink solution was prepared in the same way as in Example 1.

Example 4
Except that the dye was replaced with a dye (illustrative compound 3-4), the ink solution was prepared in the same way as in Example 1.

Example 5
Except that the dye was replaced with a dye (illustrative compound 1-6), the ink solution was prepared in the same way as in Example 1.

Example 6
Except that the dye was replaced with a dye (illustrative compound 1-7), the ink solution was prepared in the same way as in Example 1.

Example 7
Except that the dye was replaced with a dye (illustrative compound 1-8), the ink solution was prepared in the same way as in Example 1.

Example 8
Except that the dye was replaced with a dye (illustrative compound 1-9), the ink solution was prepared in the same way as in Example 1.

Example 9
Except that the dye was replaced with a dye (illustrative compound 1-10), the ink solution was prepared in the same way as in Example 1.

Example 10
Except that the dye was replaced with a dye (illustrative compound 1-13), the ink solution was prepared in the same way as in Example 1.

Example 11
Except that the dye was replaced with a dye (illustrative compound 1-15), the ink solution was prepared in the same way as in Example 1.

Example 12
Except that the dye was replaced with a dye (illustrative compound 1-16), the ink solution was prepared in the same way as in Example 1.

Example 13
Except that the dye was replaced with a dye (illustrative compound 2-1), the ink solution was prepared in the same way as in Example 1.

Example 14
Except that the dye was replaced with a dye (illustrative compound 2-2), the ink solution was prepared in the same way as in Example 1.

Example 15
Except that the dye was replaced with a dye (illustrative compound 2-3), the ink solution was prepared in the same way as in Example 1.

Example 16
Except that the dye was replaced with a dye (illustrative compound 2-5), the ink solution was prepared in the same way as in Example 1.

Example 17
Except that the dye was replaced with a dye (illustrative compound 2-10), the ink solution was prepared in the same way as in Example 1.

Comparative Example 1
Except that the dye was replaced with a dye which is represented by the following structural formula 1, the ink solution was prepared in the same way as in Example 1.

Stuctural Formula 1

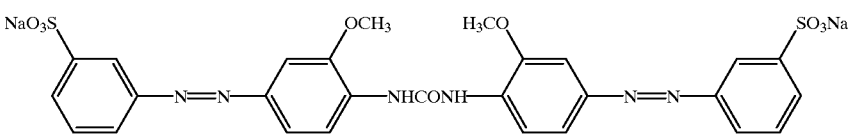

Comparative Example 2

Except that the dye was replaced with a dye which is represented by the following structural formula 2, the ink solution was prepared in the same way as in Example 1.

Structural Formula 2

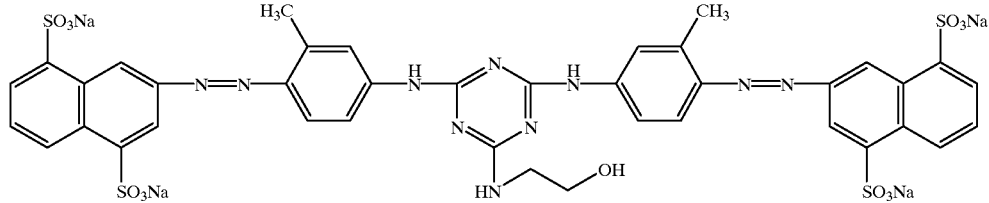

Image Recording and Evaluations

Using the ink solutions which were prepared in Examples 1 to 17 and Comparative Examples 1 and 2, an image was recorded onto a photo glossy paper (INK JET PAPER, SUPER PHOTO GRADE manufactured by Fuji Photo Film Co., Ltd.) by an ink jet printer (PM-700C manufactured by Seiko Epson Corporation).

The hue and the light fastness of the obtained image were evaluated. The hue was evaluated by two stages: A (good) and B (poor). The light fastness was evaluated as follows. The image density (Ci) of immediately after the recording was measured, and thereafter, a xenon light (85000 lux) was irradiated onto the image for three days using a weather meter (ATLAS C. 165). Afterwards, the image density (Cf) was measured again. A density remaining rate ($\{(Ci-Cf)/Ci\}\times 100\%$) is calculated from the difference between the image density before the xenon light was irradiated and the image density after the xenon light was irradiated. Accordingly, the light fastness was evaluated. The image density was measured using a reflection densitometer (X-Rite 310TR). The density remaining rate was measured at three points in which the reflection densities are 1, 1.5, and 2.0. When the density remaining rates at all of the densities are 80% or more, the light fastness is evaluated as "A" When the density remaining rates at one or two points are less than 80%, the light fastness is evaluated as "B". When the density remaining rate at all of the densities are less than 80%, the light fastness is evaluated as "C". The density remaining rate is considered as a survival rate of dye.

The above-described results are shown in Table 2 below.

TABLE 2

| | Hue (Evaluations) | Evaluations of Light Fastness |
|---|---|---|
| Example 1 | Yellow (A) | A |
| Example 2 | Yellow (A) | A |
| Example 3 | Yellow (A) | A |
| Example 4 | Yellow (A) | A |
| Example 5 | Yellow (A) | A |
| Example 6 | Yellow (A) | A |
| Example 7 | Yellow (A) | A |
| Example 8 | Yellow (A) | A |
| Example 9 | Yellow (A) | A |
| Example 10 | Yellow (A) | A |
| Example 11 | Yellow (A) | A |
| Example 12 | Yellow (A) | A |
| Example 13 | Yellow (A) | A |
| Example 14 | Yellow (A) | A |
| Example 15 | Yellow (A) | A |
| Example 16 | Yellow (A) | A |
| Example 17 | Yellow (A) | A |
| Comparative Example 1 | Yellow (B) | B |
| Comparative Example 2 | Yellow (B) | C |

As shown in Table 2, the yellow images obtained from the ink solutions of Examples 1 to 17 were clearer than the yellow images obtained from the ink solutions of Comparative Examples 1 and 2. Moreover, the light fastnesses of the images obtained by using the ink solutions of Examples 1 to 17 were excellent than that of Comparative Examples 1 and 2.

Further, using the ink solutions of Examples 1 to 17, an image was recorded onto a superfine dedicated glossy paper (MJA4S3P manufactured by Seiko Epson Corporation) by the ink jet printer (PM-700C manufactured by Seiko Epson Corporation). When the hue and the light fastness of the obtained images were evaluated, the results which are the same as those shown in Table 2 were obtained for all of the Examples.

As described above, the present invention can provide the dye, the ink for ink jet recording, and the ink jet recording method, in which the image having good hue and light fastness can be formed.

What is claimed is:

1. An ink for ink jet recording comprising at least one dye which is represented by the following general formula (1):

General formula (1)

wherein A and B each independently represents a heterocyclic group which may be substituted, and said dye has at least one ionic hydrophilic group in a molecule, wherein said dye is a dye represented by the following general formula (2), (3) or (4):

General formula (2)

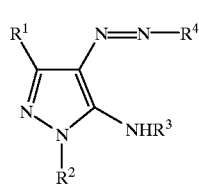

General formula (3)

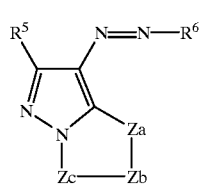

General formula (4)

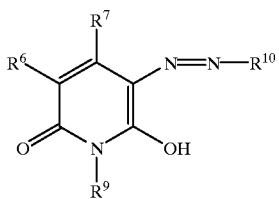

wherein, $R^1$, $R^2$, and $R^3$ each independently represents one of a hydrogen atom, a halogen atom, a cyano group, an alkyl group, a cycloalkyl group, an aralkyl group, an aryl group, an alkylthio group, an arylthio group, and an ionic hydrophilic group; $R^4$ represents any heterocyclic group which may be substituted and which is selected from the following Group 1 of heterocyclic groups; $R^5$ represents one of a hydrogen atom, a cyano group, an alkyl group, a cycloalkyl group, an aralkyl group, an aryl group, an alkylthio group, an arylthio group, and an ionic hydrophilic group; Za represents one of —N=, —NH— and —C($R^{11}$)=; Zb and Zc each independently represents one of —N= and —C($R^{11}$)=; $R^{11}$ represents one of a hydrogen atom and a nonmetallic substituent; $R^6$ represents any heterocyclic group which may be substituted and which is selected from the following Group 2 of heterocyclic groups; $R^7$ and $R^9$ each independently represents one of a hydrogen atom, a cyano group, an alkyl group, a cycloalkyl group, an aralkyl group, an aryl group, an alkylthio group, an arylthio group, and an ionic hydrophilic group; $R^8$ represents one of a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxy group, and an ionic hydrophilic group; $R^{10}$ represents any heterocyclic group which may be substituted and which is selected from the following Group 3 of heterocyclic groups; and the dye has at least one ionic hydrophilic group in a molecule, Group 1 of heterocyclic groups

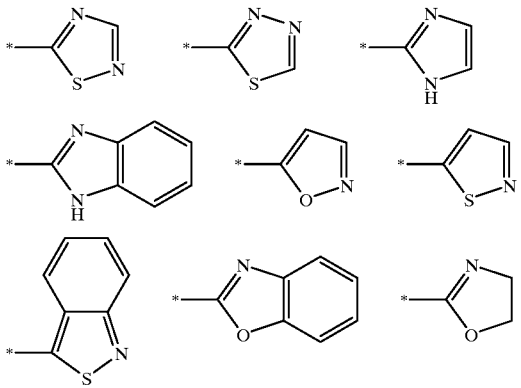

Group 2 of heterocyclic groups

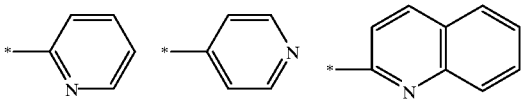
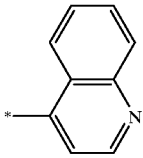
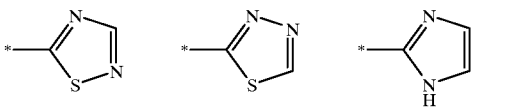
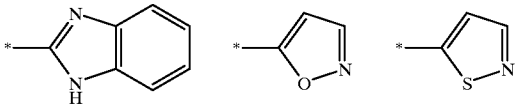
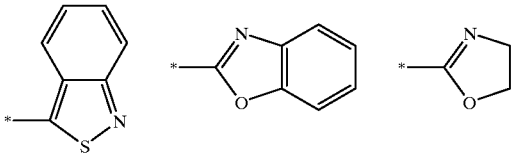
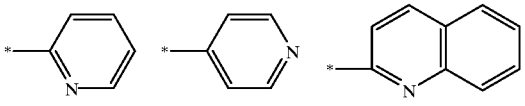
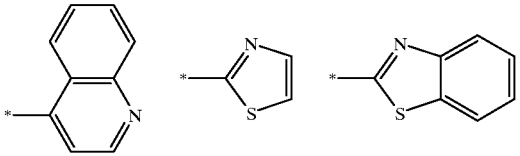
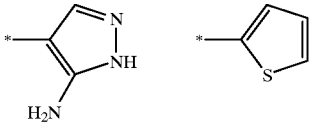

Group 3 of heterocyclic groups

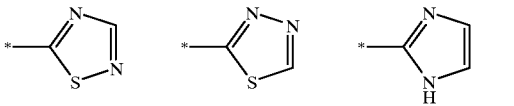
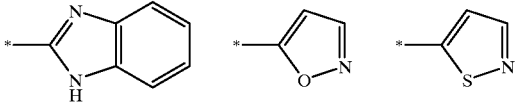
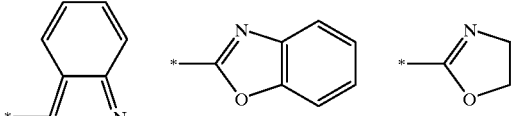
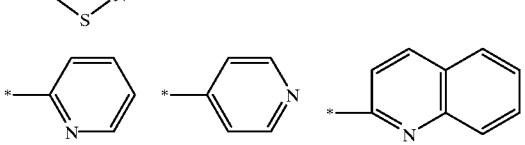

-continued

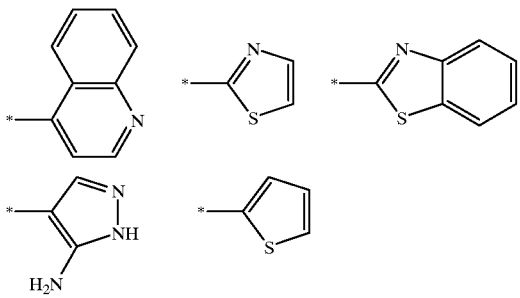

* shows a connecting position.

2. An ink for ink jet recording according to claim 1, wherein the ionic hydrophilic group is at least one of a carboxyl group and a sulfo group.

3. An ink for ink jet recording according to claim 1, wherein said dye is a yellow dye.

4. An ink for ink jet recording according to claim 3, wherein said yellow dye is a dye in which the ratio of absorbance $I\lambda_{max+70}$ at $\lambda_{max+70}$ (nm) to absorbance $I\lambda_{max}$ at $\lambda_{max}$ (nm) in the absorption spectrum of an aqueous solution thereof is 0.2 or less.

5. An ink for ink jet recording according to claim 1, wherein the viscosity of said ink for ink jet recording is 40 cp or less.

6. An ink for ink jet recording according to claim 1, wherein the surface tension of said ink for ink jet recording is 20 dyn/cm or more to 100 dyn/cm or less.

7. An ink for ink jet recording according to claim 1, wherein said ink for ink jet recording contains 0.2 parts by weight or more to 10 parts by weight or less of said dye in 100 parts by weight of said ink.

8. An ink for ink jet recording according to claim 1, wherein the dye is dissolved or dispersed in an aqueous medium.

9. An ink jet recording method in which energy is supplied to said ink for ink jet recording according to claim 1.

10. An ink jet recording method according to claim 9, wherein droplets of said ink are discharged onto an image receiving material, and an image is recorded on the image receiving material.

11. An ink for ink jet recording according to claim 1, wherein the dye is represented by the general formula (2).

12. An ink for ink jet recording according to claim 1, wherein the dye is represented by the general formula (3).

13. An ink for ink jet recording according to claim 1, wherein the dye is represented by the general formula (4).

14. A dye which is represented by the following general formula (2), (3) or (4):

General formula (2)

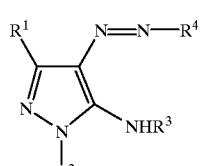

General formula (3)

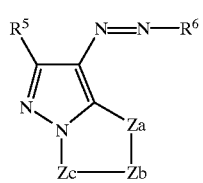

General formula (4)

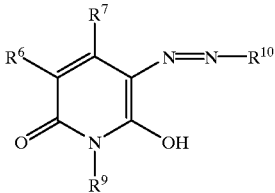

wherein $R^1$, $R^2$, and $R^3$ each independently represents one of a hydrogen atom, a halogen atom, a cyano group, an alkyl group, a cycloalkyl group, an aralkyl group, an aryl group, an alkylthio group, an arylthio group, and an ionic hydrophilic group; $R^4$ represents any heterocyclic group which may be substituted and which is selected from the following Group 1 of heterocyclic groups; $R^5$ represents one of a hydrogen atom, a cyano group, an alkyl group, a cycloalkyl group, an aralkyl group, an aryl group, an alkylthio group, an arylthio group, and an ionic hydrophilic group; Za represents one of —N═, —NH— and —C($R^{11}$)═; Zb and Zc each independently represents one of —N═ and —C($R^{11}$)═; $R^{11}$ represents one of a hydrogen group and a nonmetallic substituent; $R^6$ represents any heterocyclic group which may be substituted and which is selected from the following Group 2 of heterocyclic groups; $R^7$ and $R^9$ each independently represents one of a hydrogen atom, a cyano group, an alkyl group, a cycloalkyl group, an aralkyl group, an aryl group, an alkylthio group, an arylthio group, and an ionic hydrophilic group; $R^8$ represents one of a hydrogen atom, a halogen atom, an alkyl group, an alkoxy group, an aryl group, an aryloxy group, a cyano group, an acylamino group, a sulfonylamino group, an alkoxycarbonylamino group, a ureido group, an alkylthio group, an arylthio group, an alkoxycarbonyl group, a carbamoyl group, a sulfamoyl group, a sulfonyl group, an acyl group, an alkylamino group, an arylamino group, a hydroxy group, and an ionic hydrophilic group; $R^{10}$ represents any heterocyclic group which may be substituted and which is selected from the following Group 3 of heterocyclic groups; and the dye has at least one ionic hydrophilic group in a molecule, Group 1 of heterocyclic groups

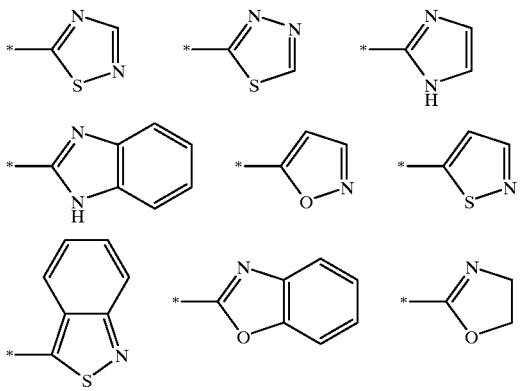

-continued
Group 2 of heterocyclic groups
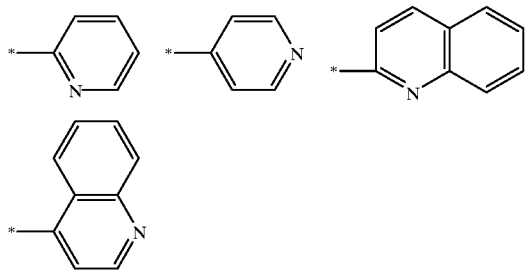
-continued
Group 3 of heterocyclic groups
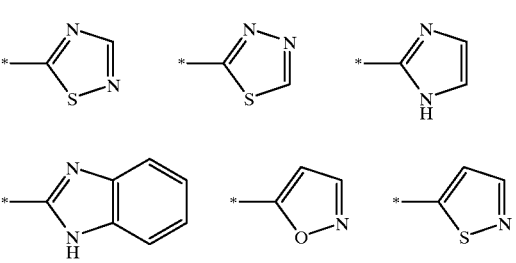
* shows a connecting position.
15. A dye according to claim 14, wherein the ionic hydrophilic group is at least one of a carboxyl group and a sulfo group.
* * * * *